(12) United States Patent
Mehta

(10) Patent No.: US 10,266,646 B2
(45) Date of Patent: Apr. 23, 2019

(54) BIO-BASED COPOLYESTER OR COPOLYETHYLENE TEREPHTHALATE

(71) Applicant: Auriga Polymers, Inc., Charlotte, NC (US)

(72) Inventor: Sanjay Mehta, Spartanburg, SC (US)

(73) Assignee: Auriga Polymers, Inc., Charlotte, NC (US)

( * ) Notice: Subject to any disclaimer, the term of this patent is extended or adjusted under 35 U.S.C. 154(b) by 2 days.

(21) Appl. No.: 15/554,587

(22) PCT Filed: Feb. 29, 2016

(86) PCT No.: PCT/US2016/020008
§ 371 (c)(1),
(2) Date: Aug. 30, 2017

(87) PCT Pub. No.: WO2016/140901
PCT Pub. Date: Sep. 9, 2016

(65) Prior Publication Data
US 2018/0037696 A1    Feb. 8, 2018

Related U.S. Application Data

(60) Provisional application No. 62/127,912, filed on Mar. 4, 2015.

(51) Int. Cl.
*C08G 63/20* (2006.01)
*C08G 63/183* (2006.01)

(52) U.S. Cl.
CPC ........ *C08G 63/183* (2013.01); *C08G 63/20* (2013.01)

(58) Field of Classification Search
USPC ................................. 528/271, 272
See application file for complete search history.

(56) References Cited

U.S. PATENT DOCUMENTS

| 2009/0246430 A1 | 10/2009 | Kriegel et al. |
| 2011/0071238 A1 | 3/2011 | Bastioli et al. |
| 2013/0261198 A1 | 10/2013 | Alidedeoglu et al. |
| 2013/0261222 A1 | 10/2013 | Schiraldi et al. |
| 2014/0197580 A1 | 7/2014 | Poulat |

OTHER PUBLICATIONS

International Search Report for International Application No. PCT/US2016/020008 dated Jun. 2, 2016.

*Primary Examiner* — Terressa Boykin
(74) *Attorney, Agent, or Firm* — Seth L. Hudson; Clements Bernard Walker PLLC

(57) ABSTRACT

The present invention relates to bio-copolyester of polyethylene terephthalate composition prepared from raw materials which are derived from biomass. The bio-composition comprises: 1) about 92 to about 99 mole % of bioPET, prepared from bioMEG and bioPTA, 2) about 1 to about 8 mole % bio-based acids, bio-based diols and/or bio-based branching agents. Bio-based acids include bio-aliphatic diacids or bio-aromatic diacids, or their corresponding bio-esters, or a mixture thereof. Bio-based diols include bio-aliphatic diol comprising 3 to 20 carbon atoms, bio-cycloaliphatic diol of 6 to 20 carbon atoms, or bio-aromatic diol comprising 6 to 14 carbon atoms, or a mixture thereof. Bio-based branching agents include bio-aliphatic compounds having more than two functionalities such as bio-trimellitic anhydride, bio-trimethylol propane, or bio-pentaerythritol, or a blend thereof.

11 Claims, 1 Drawing Sheet

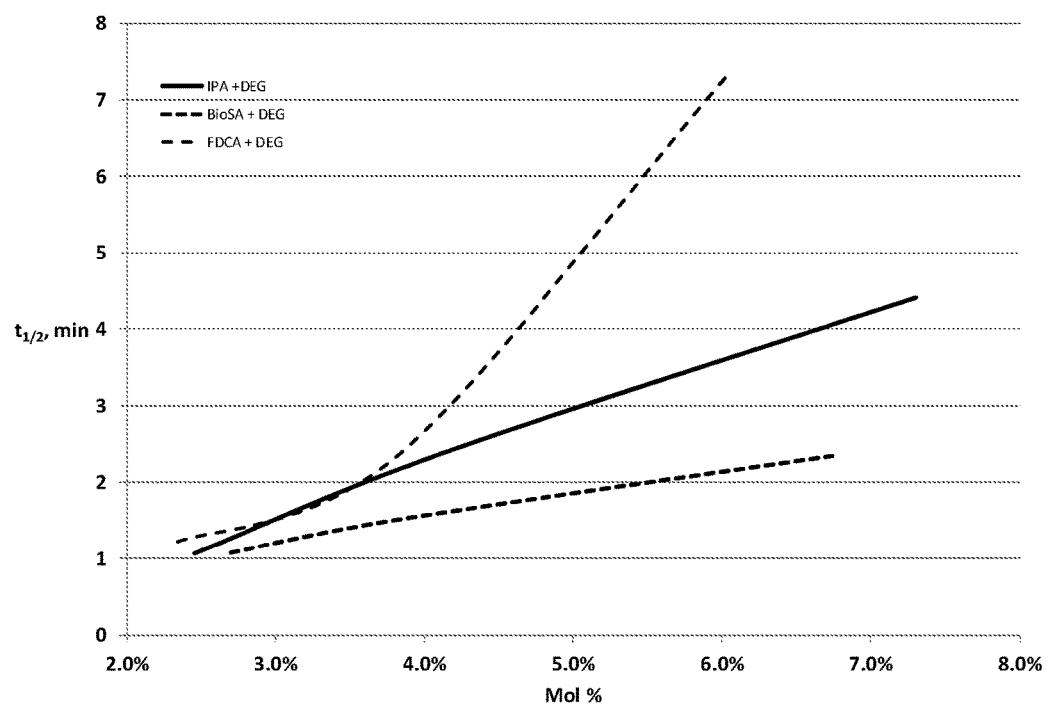

BIO-BASED COPOLYESTER OR COPOLYETHYLENE TEREPHTHALATE

FIELD OF THE INVENTION

The present invention relates to bio-copolyesters of polyethylene terephthalate which are manufactured using 100% biobased materials, such as biobased diols or biobased acids (or their ester equivalents). Further it relates to biobased crystallization retardants and branching agents, which are copolymerized with the polyethylene terephthalate. Lastly it relates to articles formed from these biobased materials of bio-diols, bio-diacids (or their bio-diester equivalents), or biobased crystallization retardants and branching agents.

BACKGROUND OF THE INVENTION

Polyethylene terephthalate (PET) and its copolyesters are widely used polymers for making packaging articles in part due to their excellent combination of clarity, mechanical, and gas barrier properties. The raw materials used in the manufacture of commercial PET polymers are purified terephthalic acid (PTA), or its dimethyl ester (DMT), and monoethylene glycol (MEG), all of which are derived from petroleum feedstocks. In many applications other comonomers are added to reduce the rate of crystallization of the PET resin during the manufacturing of the article. Typical crystallization retardants are isophthalic acid (IPA), cyclohexane dimethanol (CHDM), succinic acid (SA), and 2,5-furan dicarboxylic acid (FDCA). Branching agents, such as trimellitic based acids, are used in copolyesters where high melt strength is required for processing, for example extrusion blow molding. Currently all these comonomers are derived through petrochemical processes.

The polyester industry is actively developing processes for PTA and MEG which are based on renewable plant-based feedstocks. The advantages are reducing the carbon footprint of PET manufacturing, reducing greenhouse gas emissions and the use of a sustainable feedstock not tied to the price of oil.

Bioethanol can be produced from biomass by the hydrolysis and sugar fermentation processes. Biomass wastes contain a complex mixture of carbohydrate polymers from the plant cell walls known as cellulose, hemi-cellulose, and lignin. In order to produce sugars from the biomass, the biomass is pre-treated with acids or enzymes in order to reduce the size of the feedstock and to open up the plant structure. The cellulose and the hemi-cellulose portions are broken down (hydrolyzed) by enzymes or dilute acids into sugars that are then fermented into bioethanol. The bioethanol can be dehydrated to bioethylene from which bio monoethylene glycol—bioMEG can be produced by current chemical processes, without the use of any non-biomass chemicals, i.e. without petroleum based materials. Manufacturing facilities in India and Brazil are currently manufacturing and selling bioMEG.

Coca-Cola purchases polyester resin made from bioMEG and PTA for bottles sold under their PlantBottle® trademark. The biobased content of these bottles is about 32% from the bioMEG. There is active research and development to commercialize bioPTA such that all the major monomers (PTA and MEG) are made from biomass feedstocks. Several companies have pilot plants that convert biomass into p-xylene, which is then oxidized into bioPTA by the current PTA manufacturing process.

U.S. Patent Application 2009/0246430 discloses a method to manufacture bioPET. This bioPET comprises 25 to 75 wt. % of terephthalate compound selected from terephthalic acid, dimethyl terephthalate, isophthalic acid, and a combination thereof. It also comprises 20 to 50 wt. % of diol compound selected from ethylene glycol, cyclohexane dimethanol, and a combination thereof. At least 1 wt. % of the terephthalate compound and/or the diol compound is obtained from biomaterials. The bioPET of U.S. 2009/0246430 can be used for manufacturing beverage containers. However this application does not disclose the use of comonomers derived from biomass in their composition such comonomer as bioisophthalic acid (bioIPA) or biotrimellitic anhydride.

U.S. Patent Application 2011/0288263 discloses benzene 1,4-dicarboxylate compounds (terephthalic acid and carboxylate derivatives thereof, such as trimellitic based acids), and cyclohexane 1-4-dicarboxylate derivatives based from renewable resources. The use of muconic acid in the processes described to make these dicarboxylate derivatives, can be made from biomass, for instance by the process described in U.S. Pat. No. 5,616,496. The polyesters prepared from these monomers based on muconic acid from biomass will therefore be partially based on biobased raw materials.

U.S. Patent Application 2014/0197580 discloses a method for producing a bioPET using up to 7.5 mol % of a crystallization retarding compound. However the crystallization retardant comonomers disclosed are not produced from biomass.

It is clear that the industry will be moving to the use of bioMEG and bioPTA to manufacture bioPET. However in many applications, for example injection stretch blow molded bottles for carbonated soft drinks and water, crystallization retardants are added as comonomers in a range of about 2 to 5 mole %, based on the total copolyester, to minimize any haze in the container that would reduce clarity. Similarly comonomers such as isophthalic acid, neopentyl glycol, cyclohexanedimethanol and others are used at higher levels for amorphous copolyesters for use in sheets for thermoformed articles, shrink-films and the like. Branching agents, monomers with more than 2 functionalities, are also used for certain applications such as extrusion blow molded containers.

There is therefore a need for comonomers derived from biomass to substitute for these comonomers currently produced from petroleum feedstocks.

SUMMARY OF INVENTION

A bio-copolyester of polyethylene terephthalate composition prepared from raw materials which are derived from biomass. The bio-copolyester composition comprises: 1) about 92 to about 99 mole % of bioPET, prepared from bioMEG and bioPTA, and 2) about 1 to about 8 mole % of bio-materials, such as bio-based diacids, bio-based diols and/or bio-based branching agents. Bio-based diacids may be bio-aliphatic diacids or bio-aromatic diacids, or their corresponding bio-diesters, or a mixture thereof. Bio-based diols may be bio-aliphatic diol comprising 3 to 20 carbon atoms, bio-cycloaliphatic diol of 6 to 20 carbon atoms, or bio-aromatic diol comprising 6 to 14 carbon atoms, or a mixture thereof. Bio-materials comprising bio-based branching agents may comprise bio-aliphatic branching agent compounds having more than two functionalities such as bio-trimellitic anhydride, bio-trimethylol propane, or bio-pentaerythritol, or a blend thereof.

BRIEF DESCRIPTION OF THE FIGURE

FIG. 1 is a graph of the crystallization half-times versus mol % for the Examples illustrating fossil based IPA, bio-succinic acid, and bio-2,5-furan dicarboxylic acid.

DESCRIPTION OF THE INVENTION

For the sake of the description and the claims, the following definitions are to be considered.

In the present application "biomaterials" refer to biologically based materials, typically obtained from carbohydrates. Such materials are also referred to as "bio-materials", "biosourced materials", "bio-sourced materials", "biobased materials", "bio-based materials" or "renewable materials". The prefixes "bio" and "bio-" can be used interchangeably.

"BioPET" means a PET homopolymer produced from "bioMEG" which means MEG derived from biomaterials and "bioPTA" which means PTA derived from biomaterials. "BioPET copolyester" means bioPET containing up to 8 mole % of one or more bio-based comonomers, such as bio-diols other than bioMEG, other bio-dicarboxylic acids or their ester equivalents, other than bioPTA, and bio-branching agent(s).

In the present application, "compound(s)" refers to monomer(s) used to prepare the copolyester. The compounds are engaged in a polymerization reaction to provide polyester containing corresponding units or moieties. Thus the copolyester obtained by the process will typically contain: "moieties" or "units" corresponding to dicarboxylic acid compounds, for example terephthalic or terephthalate units or moieties or isophthalic units or moieties (including its ester equivalents), or trimellitic anhydride units or moieties, and "moieties" or "units" corresponding to diol compounds, for example monoethylene glycol units or moieties, or diethylene glycol units or moieties, or 1,4-cyclohexanedimethanol units or moieties, or trimethyol propane units or moieties, or pentaerythritol units or moieties, for example. For sake of simplicity one sometimes refers to monomers or comonomers for units or moieties.

Unless otherwise stated, the amounts of the compounds are expressed as mole % based on the weight of the copolyester.

The bioPET copolyesters can be produced by the same methods to produce PET that are known to those skilled in the art. A catalyzed transesterification reaction can be used for the dimethyl esters of the bio-monomers and bio-diols, or a direct esterification reaction (generally without catalyst) between the biobased diacids and biobased diols, to produce a low molecular weight oligomer. This low molecular weight oligomer is melt polymerized with catalyst to the required molecular weight. The typical catalysts used in this polycondensation reaction are antimony or germanium oxides, titanium or aluminum or tin compounds, or a mixture thereof. The biobased comonomers to suppress crystallization are added at the beginning or end of the transesterification or direct esterification process, thus before the melt polymerization reaction. The molten polyester is extruded through dies, quenched and cut into pellets. These pellets can be solid phase polymerized to higher molecular weight, if necessary.

The bioPET copolyester pellets can be used to produce articles that are made from completely renewable biosources. Conventional methods as used in the industry today can be used to make such articles, e.g. injection molding, compression molding, extrusion blow molding, injection stretch blow molding, sheet extrusion, etc.

The preferred biobased comonomers used as crystallization retardants are bio-succinic acid (from Myriant Corp) and bio-2,5-furan dicarboxylic acid (from Sarchem Laboratories, Inc.), or the esters of these diacids. Bio-succinic acid is commercially available and bio-furan dicarboxylic acid is at a pilot plant scale.

This invention also covers other biobased comonomers for use as crystallization retardants or branching agents. Crystallization retardants can be formed by employing bio-aliphatic or bio-aromatic diacids, or their ester equivalent, or bio-aliphatic diols comprising from 3 to 20 carbon atoms, bio-cycloaliphatic diols of 6 to 20 carbon atoms, or bio-aromatic diols comprising from 6 to 14 carbon atoms. And of course crystallization retardants can be formed by employing a combination of bio-diacids with bio-diols.

Suitable bio-diacids are bio-isophthalic acid, bio-adipic acid, bio-succinic acid, bio-cyclohexane dicarboxylic acid, and other bio-aliphatic or bio-aromatic diacids. Suitable bio-aliphatic diols, bio-cycloaliphatic diols, or bio-aromatic diols are bio-neopentyl glycol, bio-cyclohexanedimethanol and their mixtures.

Suitable bio-branching agents are bio-aliphatic compounds having more than 2 functionalities such as bio-trimellitic anhydride, bio-trimethylol propane, bio-pentaerythritol and the like, or mixtures of these.

Bio-cyclohexanedicarboxylic acid can be produced by catalytic hydrogenation of bio-PTA. Bio-PTA is available by Virent, Inc., Gevo, Inc., Anellotach, Inc., or Micromidas, Inc.

Bio-1,4 cyclohexanedimethanol (CHDM) can be produced in a two step process beginning with the catalytic hydrogenation conversion of bioDMT (produced by esterification of bioPTA) to make diester dimethyl 1,4-cyclohexanedicarboxylate (DMCD). In the second step DMCD is further hydrogenated to CHDM.

Bio-Pentaerythritol is known under the trademark Voxtar™ sold by Perstorp AB.

Other additives, preferably biosourced materials, such as reheat additives, dyes, optical brighteners, thermal and light stabilizers, antioxidants, or barrier agents may be added, either during the polymerizing stage, or after by compounding with the biocopolyester. The total amount of these additives should be below about 3 weight % of the copolyester in order for the copolyester to be essentially produced from biobased materials.

Accordingly, the copolyesters of the present invention have a biobased content of at least 95 wt. %.

Test Methods

1. ASTM D 6866-12 'Standard Test Methods for Determining the Biobased Content of Solid, Liquid, and Gaseous Samples using Radiocarbon Analysis' (Method B) is used to analyze the copolyesters of this invention. Method B utilizes Accelerator Mass Spectrometry (AMS) along with Isotope Ratio Mass Spectrometry (IRMS) techniques to quantify the biobased content of a given product, with a total uncertainty of ±3% (absolute). The 14c/12c and 13c/12c isotropic ratios are measured using ASM and determined relative to the appropriate primary reference material, i.e. SRM 4990c and RM 8544 for $^{14}C$ and $^{13}C$, respectively. Zero % $^{14}C$ represents a fossil (e.g. petroleum based) carbon source. One hundred % $^{14}C$, after correction for the post-1950 bomb injection of $^{14}C$ into the atmosphere, likewise indicates an entirely modern carbon source.

2. Intrinsic viscosity (IV)—The IV of the polyester resins was measured according to ASTM D 4603-96.

3. Isophthalic and succinic acids—The percent isophthalic acid and succinic acid present in the amorphous polymer was determined at 285 nanometers using a Hewlett Packard Liquid Chromatograph (HPLC) with an ultraviolet detector. An amorphous polymer sample was hydrolyzed in diluted sulfuric acid (10 ml acid in 1 liter deionized water) in a stainless steel bomb at 230° C. for 3 hours. After cooling, an aqueous solution from the bomb was mixed with three volumes of methanol (HPLC grade) and an internal standard solution. The mixed solution was introduced into the HPLC for analysis.
4. 2,5-furan dicarboxylic acid—The percent 2,5-furan dicarboxylic acid present in the amorphous polymer was measured by proton N.M.R measuring the chemical shift at 7.3 ppm.
5. Metal content—The metal content of the ground polymer samples was measured with an Atom Scan 16 ICP Emission Spectrograph. The sample was dissolved by heating in ethanolamine, and on cooling, distilled water was added to crystallize out the terephthalic acid. The solution was centrifuged, and the supernatant liquid analyzed. Comparison of atomic emissions from the samples under analysis with those of solutions of known metal ion concentrations was used to determine the experimental values of metals retained in the polymer samples.
6. Transition temperatures and crystallization half-time: The base line of the DSC instrument was calibrated by running at a heating rate of 10° C./minute, without any samples (even no reference sample) in the DSC, from 0° C. to 350° C. The calibration of the cell constant of the DSC instrument was done with high-purity indium. A mass of about 10 mg was used for each indium sample and the heating rate was 10° C./minute. The calibration of the temperature scale was done by indium, tin, lead and bismuth. A mass of about 10 mg was used for each metal at a heating rate was 10° C./minute. The melting point for each metal was determined by measuring the tangential value of the left side of the melting endotherm peak.

Each sample is dried at 160° C. for 24 hrs at a reduced pressure of 1 mbar before measuring the transition temperatures and crystallization half-times. The glass transition temperature (Tg), cold crystallization temperature (Tcc), melting peak temperature (Tm), and hot crystallization temperature (Tch) were measured in accordance with ASTM D 3418-03 at a scan rate of 10° C./min. The isothermal crystallization half-times were measured at 160°, 170° and 180° C., cooling from the melt at 300° C. to these temperatures at 320° C./min. To compare the crystallization half-times at the same degree of super-cooling, the half-time data from these three temperatures were interpolated to calculate the crystallization half time at (Tm-65) ° C.

Polymer Preparation

The following procedure was used to make copolyesters containing isophthalic acid (IPA), bio-2,5-furan dicarboxylic acid (bio-FDCA) (Sarchem Laboratories Inc.) or bio-succinic acid (bio-SA) (Myriant Corporation) or a mixture thereof as comonomers.

Copolymers of PET were prepared using a DMT/MEG mole ratio of 2.3:1 in a 1 kg laboratory batch autoclave. DMT, MEG and diethylene glycol (DEG) were charged along with manganese acetate as ester interchange catalyst (80 ppm elemental Mn) and antimony trioxide (250 ppm elemental Sb) as polymerization catalyst to the autoclave equipped with a stirring rod and condenser. While stirring, the autoclave was heated to a set point of 230° C., methanol evolution began at a batch temperature of 190° C. Methanol distillation continued for 120 minutes during which the batch temperature increased from 190° C. to 235° C. After the batch temperature leveled out and no methanol was distilling out, the ester interchange catalyst was sequestered with polyphosphoric acid (60 ppm elemental P), and cobalt acetate was added as a toner (5 ppm elemental Co) together with 8 ppm carbon black as a reheat additive. At this time the comonomer was added, and then a vacuum ramp was initiated for 60 min. to reduce the pressure to 100 to 250 Pa and an additional distillation fraction (ethylene glycol) was collected. The reaction mixture was left under vacuum and stirring for over two hours until the polymer achieved a certain melt viscosity, as determined by an increase in torque of the stirrer. The vacuum was released and the molten polymer was extruded under nitrogen pressure through the exit valve at the bottom of the autoclave into a water quench bath. The quenched strand was strung through a pelletizer, equipped with an air jet to dry the polymer free from moisture and cut into pellets.

Examples 1-9

IPA, bio-FDCA or bio-SA were added at the 1.3, 3.0 and 6.0 mol % as comonomers in the polymer preparation procedure given above. Examples 1, 4 and 7 are comparative examples using fossil based IPA, and the other Examples using biobased comonomers are the inventive examples. The analysis of these copolyesters is set forth in Table 1.

TABLE 1

| | Example | | | | | | | | |
|---|---|---|---|---|---|---|---|---|---|
| | 1 Comp. | 2 Inv. | 3 Inv. | 4 Comp. | 5 Inv. | 6 Inv. | 7 Comp. | 8 Inv. | 9 Inv. |
| IPA, mol % | 1.28 | — | — | 2.87 | — | — | 5.93 | — | — |
| Bio-FDCA, mol % | — | 1.30 | — | — | 2.79 | — | — | 4.78 | — |
| Bio-SA, mol % | — | — | 1.18 | — | — | 2.52 | — | — | 5.36 |
| IV, dl/g | 0.643 | 0.637 | 0.660 | 0.684 | 0.613 | 0.727 | 0.692 | 0.678 | 0.709 |
| DEG, mol % | 1.18 | 1.00 | 1.52 | 1.28 | 1.03 | 1.32 | 1.37 | 1.32 | 1.43 |
| Tg, ° C. | 79.4 | 79.9 | 76.4 | 78.6 | 79.0 | 72.6 | 76.6 | 80.4 | 64.8 |
| Tcc, ° C. | 140.2 | 138.2 | 134.2 | 142.5 | 142.7 | 132.5 | 194.4 | 167.4 | 127.8 |
| Tm, ° C. | 246.3 | 247.2 | 247.0 | 238.1 | 235.9 | 242.2 | 223.3 | 218.3 | 230.1 |
| Tch, ° C. | 182.6 | 183.4 | 187.6 | 160.7 | 160.1 | 174.1 | 145.8 | -nd- | 158.5 |

TABLE 1-continued

| | Example | | | | | | | | |
|---|---|---|---|---|---|---|---|---|---|
| | 1 Comp. | 2 Inv. | 3 Inv. | 4 Comp. | 5 Inv. | 6 Inv. | 7 Comp. | 8 Inv. | 9 Inv. |
| | Crystallization half-time, min. | | | | | | | | |
| 160° C. | 1.27 | 1.40 | 1.09 | 2.47 | 2.48 | 1.56 | 4.82 | 8.02 | 1.80 |
| 170° C. | 1.13 | 1.27 | 1.03 | 2.27 | 2.32 | 1.42 | 5.07 | 8.18 | 1.91 |
| 180° C. | 1.10 | 1.26 | 1.10 | 2.48 | 2.36 | 1.57 | 6.78 | 9.41 | 2.43 |
| (Tm-65)° C. | 1.07 | 1.22 | 1.08 | 2.41 | 2.36 | 1.52 | 4.41 | 7.38 | 1.70 | nd—not determined

The crystallization half-times for the same degree of super-cooling (Tm-65) ° C. for these examples is shown in FIG. 1. This FIGURE shows that the amount of these bio-comonomers can be chosen to have the same crystallization rate as the fossil base IPA, and therefore can be used as crystallization retardants for copolyester manufactured from 100% biosourced raw materials.

Thus it is apparent that there has been provided, in accordance with the invention, a bio-copolyester composition comprising: 1) about 92 to about 99 mole % bioPET, and 2) about 1 to about 8 mole % bio-materials such as bio-crystallization retardant or bio-branching agent or a mixture thereof, wherein a bio-copolyester is polymerized to reduce the rate of crystallization, or to provide high melt strength for processing, for extrusion blow molding, for example. These inventions fully satisfy the objects, aims, and advantages set forth herein. While the invention has been described in conjunction with specific embodiments thereof, it is evident that many alternatives, modifications, and variations will be apparent to those skilled in the art in light of the foregoing description. Accordingly it is intended to embrace all such alternatives, modifications and variations as fall within the spirit and broad scope of the appended claims.

What is claimed is:

1. A bio-copolyester composition comprising: from about 92 to about 99 mole % bioPET and about 1 to about 8 mole % of biobased monomers not employed in bioPET.

2. The bio-copolyester composition of claim 1, wherein said biobased monomers are selected from: 1) bio-based diacids, 2) bio-based diols, or 3) bio-based branching agents.

3. The bio-copolyester composition of claim 2, wherein said bio-based diacids comprise bio-aliphatic diacids or bio-aromatic diacids, or their corresponding bio-esters, or a mixture thereof.

4. The bio-copolyester composition of claim 3, wherein said bio-based diacids include bio-isophthalic acid, bio-adipic acid, bio-succinic acid, or bio-2,5-furan dicarboxylic acid, or a mixture thereof.

5. The bio-copolyester composition of claim 2, wherein said bio-based diols comprise bio-aliphatic diol comprising 3 to 20 carbon atoms, bio-cycloaliphatic diol of 6 to 20 carbon atoms, or bio-aromatic diol comprising 6 to 14 carbon atoms, or a mixture thereof.

6. The bio-copolyester composition of claim 5, wherein said bio-based diols include bio-diethylene glycol, bio-neopentyl glycol, bio-cyclohexanedimethanol, or a mixture thereof.

7. The bio-copolyester composition of claim 2, wherein said bio-based branching agents include bio-aliphatic compounds having more than two functionalities such as bio-trimellitic anhydride, bio-trimethylol propane, or bio-pentaerythritol, or a blend thereof.

8. The bio-copolyester composition of claim 1, wherein optional additives, such as reheat additive, dyes, optical brighteners, thermal and light stabilizers, antioxidants or barrier agents may be added, either during the polymerizing stage, or after by compounding with the copolyester composition.

9. The bio-copolyester composition of claim 1, wherein said composition has a bio-based content of at least 95 wt. % as measured by ASTM D6856-12, Method B.

10. An article produced from the bio-copolyester composition of claim 1.

11. An article produced from the bio-copolyester composition of claim 2.

* * * * *